3,326,813
URANIUM TRIOXIDE SOL PROCESS
Frederick T. Fitch and Jean G. Smith, Baltimore, Md., assignors to W. R. Grace & Co., New York, N.Y., a corporation of Connecticut
No Drawing. Filed Sept. 23, 1964, Ser. No. 398,791
10 Claims. (Cl. 252—301.1)

This invention relates to uranium trioxide sols and to colloidal uranium trioxide particles and to a process for producing these compositions. More particularly, this invention relates to the preparation of uranium trioxide sols by peptizing aqueous suspensions of a diuranate.

In summary, the process of this invention comprises a method for preparing a highly stable uranium trioxide aquasol comprising the steps of dispersing a substantially electrolyte-free alkaline-precipitated diuranate in water, and heating the dispersion at a temperature within the range of from about 60 to 150° C. while replacing the cations in the solution with hydrogen ions until peptization occurs or replacing the cations in the solution with hydrogen ions until the solution pH is within the range of from about 5 to 6 and then heating the dispersion at a temperature within the range of from about 60 to 150° C. until peptization occurs.

In summary, the composition of this invention comprises uranium trioxide having a particle size of from about 3 to 250 millimicrons, as an aquasol and as the dried aquasol particles.

The preferred embodiment of the process of this invention is a method for preparing a highly stable uranium trioxide aquasol comprising the steps of mixing a solution of a soluble uranyl salt of a monovalent acid with an alkaline precipitating reagent selected from the group consisting of ammonia gas, ammonium hydroxide solution, alkali metal hydroxide, an amine having a base constant, $K_b$, greater than $1 \times 10^{-8}$, and mixtures thereof, to form the corresponding diuranate; separating the diuranate from the solution and washing it substantially free from electrolytes, preferably by first washing with a weak solution of the precipitant, preferably a weak ammonia solution, followed by a water wash; redispersing the electrolyte-free diuranate precipitate in sufficient water to provide a concentration of from about 1 to 12 weight percent solids, preferably a concentration equivalent to about from 2.5 to 10 grams of $UO_2$ per 100 milliliters of suspension; mixing the diuranate dispersion with a quantity of a cation exchange resin in the hydrogen form which is sufficient to provide an equilibrium pH within the range of from 6 to 7; heating the resin dispersion mixture within the range of from about 60 to 150° C. until peptization occurs, preferably for at least about one hour at a temperature within the range of from about 80 to 110° C.; and separating the resin from the uranium trioxide sol produced.

The uranium oxide sols are of prime interest in the preparation of ceramic nuclear reactor fuel elements. Fuel elements prepared from sols have the advantage of higher mechanical strength and lower sintering temperature than those produced from conventional ceramic powders. The production of sintered microspheres from uranium dioxide sol particles has been previously described. The uranium dioxide aquasol is dispersed in an immiscible solvent and dried, producing an uranium dioxide microsphere. The resulting microspheres are then sintered to near theoretical density by heating at temperatures above about 1200° C. in an atmosphere of hydrogen. Uranium trioxide sols and dried compositions offer several advantages over uranium dioxide sol particles in the production of uranium dioxide sintered microspheres. Most significantly, microspheres derived from uranium trioxide sinter at lower temperatures. Also, since the sols can be prepared directly from uranyl salts by the process of this invention, the necessity for the previously employed uranyl to uranous reduction step is eliminated. Furthermore, in the production of microspheres from aqueous sols by solvent dehydration techniques, uranium trioxide droplets can be dehydrated to form microspheres over a wider range of process conditions.

It is one object of this invention to provide a method for making uranium trioxide aquasols.

It is another object of this invention to provide a composition of matter consisting essentially of uranium trioxide having a particle size of from about 3 to 250 millimicrons, as a dried powder or as a dispersed phase in an aquasol.

The uranium trioxide aquasol is formed by peptization of a freshly precipitated diuranate by ion exchange removal of cations from the diuranate. The diuranate precipitate is obtained by mixing a solution of a soluble uranyl salt with an alkaline precipitating agent following procedures well known in the art.

Any soluble uranyl salt can be used to make the uranyl salt solution. Uranyl salts of monovalent acids are preferred. Example of suitable salts are uranyl chloride, nitrate, formate, acetate, sulfate and mixtures thereof. Preferably, the uranyl salt solution is diluted to a concentration equivalent to from about 1 to 20 grams $UO_2$ per 100 ml. of solution. The alkaline precipitating agent can be any conventional water-soluble material which is alkaline with the exception of carbonates. For example, the alkaline precipitating agent can be ammonia, an aqueous ammonium hydroxide solution, an alkali metal hydroxide solution, an amine having a base constant, $K_b$, of greater than $1 \times 10^{-8}$, and mixtures thereof. Suitable amines include methyl amine, ethyl amine, hydrazine, etc.

When the uranyl salt solution is mixed with the alkaline precipitating agent, a diuranate precipitate is obtained which has cations corresponding to the particular alkaline precipitating agent employed. The diuranate precipitate is separated from the solution by filtration, for example, and is washed free of electrolytes. The preferred method for washing the precipitate free from electrolytes is by first washing the precipitate with the dilute ammonium hydroxide solution, about 5 N ammonium hydroxide followed by a water wash. Preliminary washing with a dilute solution of the precipitant can be employed. The washing is continued with water until the precipitate begins to peptize through the filter.

The electrolyte-free diuranate precipitate is then redispersed in water to the desired concentration. A dispersion concentration equivalent to from about 1 to 12 grams of $UO_2$ per 100 milliliters of dispersion can be employed. The preferred concentration is equivalent to about from 2.5 to 10 grams of $UO_2$ per 100 milliliters of dispersion.

The diuranate dispersion is then peptized to form a uranium trioxide aquasol by exchanging the cation with hydrogen ions and heating the dispersion. The cation exchange can be obtained by the use of ion exchange resins or by electrodialysis techniques.

With the ion exchange resin method, the aqueous dispersion of the diuranate is exchanged with a cation exchange resin in the hydrogen form. Suitable resins are Amberlite IR-120 and Dowex 50, for example. Preferably, the dispersion is heated during the ion exchange step, and the quantity of ion exchange resin employed is just sufficient to complete peptization of the system. Peptization can be determined by simple visual examination, for example. The cation exchange with the ion exchange resin is more rapid at the elevated temperatures present during the heating, and the sol is produced in the single step. Heating at temperatures within the range of from about 60 to 150° C. is suitable. However, if ion exchange resins lacking the necessary thermal stability for use at the higher temperatures are employed, a maximum temperature of 110° C. can be employed. The preferred peptization conditions with simultaneous heating and ion exchange comprise heating for at least about one hour at a temperature within the range of from about 80 to 110° C.

Alternatively, the ion exchange can be completed with the ion exchange resin prior to the heating step. The quantity of ion exchange resin employed is sufficient to just provide complete peptization during the heating step, a quantity which will provide a dispersion pH within the range of from about 5 to 6 prior to the heating step. Following the ion exchange, the dispersion is heated at the same temperatures as described with respect to the simultaneous ion exchange-heating technique. Preferably, the dispersion is separated from the ion exchange resin prior to the heating step, for example by filtration.

In the technique of ion exchange by electrodialysis, the dispersion is circulated through the anode compartment of an electrodialyzer. Deionized water is passed through the cathode compartment. The anode and cathode compartments are separated by a cation exchange membrane such as a Nepton CR-61 membrane. When an electrical potential is applied between the electrodes, which are constructed of inert materials such as platinum or carbon, cations migrate through the membrane toward the cathode. This results in cation exchange of the diuranate. In this process, the ion exchange can also occur simultaneous with or before the heating step. However, since the ion exchange membranes are even less thermally stable than the ion exchange resins, dispersions having a high temperature cannot be passed through the anode compartment of the electrodialyzer. For simultaneous heating and ion exchange, the dispersion can be heated in a reservoir and a portion thereof can be removed, cooled, passed through the anode compartment for ion exchange, and then returned to the reservoir of heated dispersion. Therefore, because of the difficulties of simultaneous ion exchange and heating in the electrodialysis technique, the sequential exchange-heating procedure is preferred. By this technique the diuranate dispersion is subjected to ion exchange in the anode compartment of the electrodialyzer until the dispersion pH is within the range of from about 5 to 6, i.e., until the dispersion will be just completely peptized during the subsequent heating step. The heating temperatures and times suitable in the electrodialysis techniques are the same as described with respect to the ion exchange resin techniques, heating at temperatures within the range of from 60 to 150° C. until peptization occurs.

The final uranium trioxide sol produced by the method of this invention has a pH in the range of about 6.0 to 7.0; a pH of 6.5 is optimum. Its maximum stability falls within this pH range, although the sol will remain stable for a time outside of these limits. Within the maximum stability, specific conductance of the aquasol at 25° C. ranges from about $1 \times 10^{-4}$ to $1 \times 10^{-6}$ mhos/cm., varying as a function of the sol concentration. The sol pH can be measured with a Beckman Model G pH meter, and the specific conductance can be measured with an Industrial Instruments conductivity bridge, Model DC 16B1. The sol particles are negatively charged as determined by electrophoresis techniques.

Relative kinematic viscosity was likewise found to vary with concentration. The relative kinematic viscosity, $N_k$, of the sols was determined from the drain time of the sol $t_s$, and the drain time of water, $t_w$, in an Ostwald viscometer according to the equation:

$$N_k = \frac{t_s}{t_w}$$

The general character of the particles was determined by use of the electron microscope. Electron microphotographs showed the uranium trioxide aquasol particles to range from about 3 to 250 millimicrons in size. The presence of the uranium monohydrate and dihydrate could be detected by X-ray diffraction. The relative proportion of the monohydrate and dihydrate present is apparently determined by the temperature and the extent of heating of the sol during the peptization step.

Uranium trioxide aquasol can be concentrated to the equivalent of about 15 grams of $UO_2$ per 100 milliliters of aquasol by evaporation. Further concentration by evaporation is difficult because the viscosity of the concentrated aquasol becomes prohibitively high. However, if the uranium trioxide aquasol is further concentrated, it can be diluted reversibly. An alternate method for concentrating these sols involves centrifuging followed by redispersion of the sol particles in a smaller amount of water.

The uranium trioxide particles in the aquasol can be obtained as a dry powder from the aquasol by evaporation to dryness in vacuum, or by centrifuging the sol particle and separating the clear supernatant liquid therefrom.

The invention is further illustrated by the following specific but non-limiting examples.

Example 1

In this example, 2222 ml. of a solution containing the equivalent of 5 grams $UO_2$ per 100 ml. of solution was mixed, while stirring, with 378 ml. of a 5 N ammonia solution. An ammonium diuranate precipitate was formed and was separated from the solution by filtration. The filtrate was washed free of chloride ions with 5 N ammonium hydroxide solution and was then washed with water to the point of incipient peptization.

The washed precipitate was redispersed in deionized water to form a suspension having a volume of 1300 ml. A 225 ml. portion of well-drained Amberlite IR-120 cation exchange resin in the hydrogen form was then mixed into the dispersion while stirring. The resin-dispersion mixture was then heated for 2 hours at 100° C. under reflux, and the stable yellow uranium trioxide aquasol was formed. The physical properties of the aquasol were found to be as follows:

| | |
|---|---|
| pH | 6.33 |
| Specific conductance, mhos/cm. | $4.08 \times 10^{-5}$ |
| Density, gm./cc. | 1.0673 |
| Concentration, wt. percent equivalent $UO_2$ | 7.20 |
| Relative kinematic viscosity | 1.71 |
| Particle size range, millimicrons | 5 to 100 |

Example 2

The procedure of Example 1 was exactly followed to the step of heating the ion exchange resin-dispersion mixture. In this example, the mixture was heated for 2 hours at 80° C. rather than at 100° C. The product was a stable yellow uranium trioxide aquasol, but the electron micrographs showed that the particle dispersion was less complete than in the system heated at 100° C. under reflux. The difference is reflected by a higher aquasol viscosity. The sol properties found are tabulated below:

| | |
|---|---|
| pH | 6.16 |
| Specific conductance, mhos/cm. | $4.49 \times 10^{-5}$ |
| Density, gm./cc. | 1.0505 |
| Concentration, wt. percent equivalent $UO_2$ | 6.32 |
| Relative kinematic viscosity | 7.76 |
| Particle size range, millimicrons | 15 to 100 |

Example 3

In this example the concentration of the uranium trioxide aquasol was increased from 2.28 grams to 11.6 grams equivalent $UO_2$ per 100 ml. by evaporation at 100° C. under atmospheric pressure. The evaporation was carried out under partial reflux to avoid deposition on the container walls. The volume of the aquasol was maintained at a constant value of 250 ml. by replacing the evaporated liquid with more aquasol as the evaporation proceeded. Altogether, 1250 ml. of aquasol were concentrated to a final volume of 250 ml. The changes in pH and specific conductance of the aquasol before and after the concentration step were as follows:

|  | Before | After |
|---|---|---|
| pH | 6.37 | 5.56 |
| Specific conductance, mhos/cm | 3.08×10⁻⁵ | 1.89×10⁻⁴ |
| Concentration, wt. equivalent $UO_2$/100 ml | 2.28 | 11.6 |

The prolonged heating did not lower the aquasol stability. In fact, electron microscopy showed a slight improvement in particle dispersion.

*Example 4*

Sodium diuranate was precipitated from 130 ml. of an uranyl chloride solution containing the equivalent of 50.0 grams $UO_2$ per 100 ml. by adding a sodium hydroxide solution prepared by dissolving 37.6 grams NaOH in water to make 220 ml. of solution. The precipitate, sodium diuranate, was then washed free of chloride ions with a 5 N ammonia solution, and was then washed with deionized water to the point of incipient peptization. The precipitate was then redispersed to a volume of 1300 ml. with water and was mixed with 300 ml. of Amberlite IR–120 cations exchange resin in hydrogen form. The mixture was heated to 87° C., and then the resin was filtered from the dispersion. Heating of the uranium trioxide was continued at 80° C. for 2 hours. Bright yellow uranium trioxide aquasol was recovered having the following properties:

pH ............................................ 6.48
Specific conductance, mhos/cm. .......... 7.17×10⁻⁵
Density, gm./cc. ............................ 1.0173
Concentration, wt. percent equivalent $UO_2$ .. 2.26

The sol showed a slight tendency to settle out after standing for several days, but could be completely redispersed by mild agitation. Electron micrographs revealed that peptization was incomplete.

*Example 5*

A 120 ml. portion of the sol product of Example 4 was autoclaved in a pressure vessel for 20 hours, the temperature rising slowly to a maximum of 120° C. The autoclaving further peptized the sol so that now the constituent particles were open-centered units from 7 to 10 millimicrons in size. These were loosely chained and associated. Also formed by the autoclaving were dense needle-like particles ranging up to 200 millimicrons in length. Other changes in properties after autoclaving were found to be as follows:

|  | Before | After |
|---|---|---|
| pH | 6.48 | 7.54 |
| Specific conductance, mhos/cm | 7.17×10⁻⁵ | 9.39×10⁻⁵ |

The uranium trioxide aquasol was still fluid after 6 months. Slight settling did occur on prolonged standing, but a complete redispersion could be achieved with minimum agitation.

Obviously, many modifications and variations of this invention may be made without departing from the essence and scope thereof, and only such limitations should be applied as are indicated in the appended claims.

We claim:
1. A process for preparing a uranium trioxide aquasol comprising the steps of:
   (a) dispersing an alkaline precipitated diuranate in water, and
   (b) replacing the cations in the solution with hydrogen ions and heating the dispersion at a temperature within the range of from about 60 to 150° C. until peptization occurs.
2. A process for preparing a uranium trioxide aquasol comprising the steps of:
   (a) dispersing an alkaline precipitated diuranate in water, and
   (b) replacing the cations in the solution with hydrogen ions, while heating the dispersion at a temperature within the range of from 60 to 150° C. until peptization occurs.
3. A process for preparing a uranium trioxide aquasol comprising the steps of:
   (a) dispersing an alkaline precipitated diuranate in water,
   (b) replacing the cations in the solution with hydrogen ions until the dispersion pH is within the range of from about 5 to 6, and
   (c) heating the dispersion at a temperature within the range of from 60 to 150° C. until peptization occurs.
4. A process for preparing a uranium trioxide aquasol comprising the steps of:
   (a) mixing a water dispersion of an alkaline-precipitated diuranate with a cation exchange resin in the hydrogen form,
   (b) heating the resin-dispersion mixture at a temperature within the range of from about 60 to 150° C. until peptization occurs, and
   (c) separating the uranium trioxide aquasol formed from the ion exchange resin.
5. The process of claim 4 wherein the resin-dispersion mixture is heated for at least about one hour at a temperature within the range of from about about 80 to 110° C. to form the uranium trioxide aquasol.
6. A process for preparing a uranium trioxide aquasol comprising the steps of:
   (a) mixing a solution of a soluble uranyl salt with an alkaline precipitating agent to form a diuranate precipitate,
   (b) separating the diuranate precipitate from the solution and washing it substantially free from electrolyte,
   (c) redispersing the washed diuranate precipitate in water,
   (d) mixing the diuranate dispersion with a cation exchange resin in the hydrogen form,
   (e) heating the resin-dispersion mixture at a temperature within the range of from about 60 to 150° C. until peptization occurs, and
   (f) separating the resin from the uranium trioxide aquasol produced.
7. The process of claim 6 wherein the diuranate precipitate is dispersed in sufficient water to provide a concentration of 1 to 12 percent solids by weight.
8. The process according to claim 6 wherein the resin-dispersion mixture is heated at a temperature within the range of from about 80 to 110° C. for at least about one hour to form the uranium trioxide aquasol.
9. A process according to claim 6 wherein the uranyl salt is a salt of an acid having a monovalent anion.
10. A process according to claim 6 wherein the alkaline precipitating agent is selected from the group consisting of ammonia, ammonium hydroxide solution, alkali metal hydroxide, an amine having a base constant, $K_b$, of greater than $1\times10^{-8}$ and mixtures thereof.

References Cited

UNITED STATES PATENTS 3,024,199 3/1962 Pasfield ............ 252—301.1
3,272,602 9/1966 Suehiro et al. ........ 23—354

CARL D. QUARFORTH, *Primary Examiner.*

BENJAMIN R. PADGETT, *Examiner.*

S. J. LECHERT, Jr., *Assistant Examiner.*